(12) United States Patent
Capalija et al.

(10) Patent No.: US 10,437,743 B1
(45) Date of Patent: Oct. 8, 2019

(54) INTERFACE CIRCUITRY FOR PARALLEL COMPUTING ARCHITECTURE CIRCUITS

(71) Applicant: Altera Corporation, San Jose, CA (US)

(72) Inventors: Davor Capalija, Etobicoke (CA); Andrei Mihai Hagiescu Miriste, Toronto (CA); John Stuart Freeman, Waterloo (CA); Alan Baker, Toronto (CA)

(73) Assignee: Altera Corporation, San Hose, CA (US)

( * ) Notice: Subject to any disclaimer, the term of this patent is extended or adjusted under 35 U.S.C. 154(b) by 566 days.

(21) Appl. No.: 15/088,378

(22) Filed: Apr. 1, 2016

(51) Int. Cl.
| | |
|---|---|
| *G06F 13/10* | (2006.01) |
| *H04L 12/935* | (2013.01) |
| *G06F 13/20* | (2006.01) |
| *G06F 13/40* | (2006.01) |
| *G06F 13/42* | (2006.01) |

(52) U.S. Cl.
CPC .......... *G06F 13/102* (2013.01); *G06F 13/20* (2013.01); *G06F 13/4068* (2013.01); *G06F 13/4282* (2013.01); *H04L 49/3063* (2013.01)

(58) Field of Classification Search
CPC .. G06F 13/20; G06F 13/4068; G06F 13/4282; G06F 3/102; H04L 49/3063
See application file for complete search history.

(56) References Cited

U.S. PATENT DOCUMENTS

| | | | | |
|---|---|---|---|---|
| 4,814,973 A | * | 3/1989 | Hillis | G06F 15/17381 712/16 |
| 5,243,699 A | * | 9/1993 | Nickolls | G06F 15/8007 712/11 |
| 5,446,738 A | * | 8/1995 | Kim | H04J 3/247 370/395.42 |
| 5,850,389 A | * | 12/1998 | Wesler | H04L 12/433 370/325 |
| 7,555,409 B1 | * | 6/2009 | Bhaskar | G01N 21/95684 702/185 |
| 8,700,845 B1 | * | 4/2014 | Bowers | G11C 7/1003 711/110 |
| 2003/0174724 A1 | * | 9/2003 | Olson | G06F 13/4072 370/420 |
| 2004/0093450 A1 | * | 5/2004 | Andreas | G06F 13/4291 710/110 |

(Continued)

*Primary Examiner* — Tim T Vo
*Assistant Examiner* — Phong H Dang (57) ABSTRACT

The present embodiments relate to interface circuitry between a serial interface circuit and an array of processing elements in an integrated circuit. The interface circuitry may include a daisy chain of feeder circuits and a daisy chain of drain circuits. If desired, the interface circuitry may include multiple daisy chains of feeder circuits and/or multiple daisy chains of drain circuits. These multiple daisy chains of feeder circuits and drains circuits may be coupled in parallel, respectively. In some embodiments, the interface circuitry may include synchronization circuitry that is coupled between the daisy chains of drain circuits and the serial interface circuit. Pipeline register stages between feeder circuits and/or between drain circuits may enable the placement of the feeder circuits and/or the drain circuits spatially close to the processing elements of the array of processing elements.

16 Claims, 7 Drawing Sheets

(56) References Cited

U.S. PATENT DOCUMENTS

| | | | |
|---|---|---|---|
| 2006/0095592 A1* | 5/2006 | Borkenhagen | G06F 13/1673 710/2 |
| 2008/0294855 A1* | 11/2008 | Chen | G06F 12/0215 711/154 |
| 2011/0153889 A1* | 6/2011 | Barrenscheen | H04L 12/403 710/110 |
| 2015/0363166 A1* | 12/2015 | Christidis | G06F 5/14 710/117 |

* cited by examiner

INTERFACE CIRCUITRY FOR PARALLEL COMPUTING ARCHITECTURE CIRCUITS

BACKGROUND

The present embodiments relate to integrated circuits and, more particularly, to interface circuitry between a serial interface circuit and an array of processing elements in an integrated circuit.

Many modern applications in domains such as image and signal processing, particularly when coupled with real-time constraints, require the use of massively parallel computing architectures. These architectures often fulfill the demand for distributed memory and computing power, simple and regular communication structure, intensive use of pipelining, and local communication in time and space.

Massively parallel computing architectures are often implemented by an array of processing elements, which is sometimes also referred to as a processor array. A systolic array is often the preferred implementation form of such a processor array. A systolic array is a homogeneous network made out of relatively simple processors that are regularly and locally connected. Those processors are sometimes also referred to as processing elements or data processing units. Data circulate through these processors in a synchronous manner and interact where they meet.

An array of processing elements offers the possibility of optimizing power, time, and area, and can provide the I/O bandwidth which is necessary for the implementation of computational-intensive high-throughput algorithms. In many applications, the array of processing elements receives the data for processing through a serial interface circuit.

SUMMARY

Interface circuitry of an array of processing elements in an integrated circuit may include feeder circuits and drain circuits that are coupled in first and second daisy chains, respectively. A first feeder circuit of the feeder circuits may receive a first data signal from a serial interface circuit, and a control circuit in the first feeder circuit may control a transmission of the first data signal to a second feeder circuit of the feeder circuits and to a first processing element of the array of processing elements. A first drain circuit of the drain circuits may receive a second data signal from a second processing element of the array of processing elements and a third data signal from a second drain circuit of the drain circuits. The first drain circuit may send the second and third data signals to the serial interface circuit.

It is appreciated that the embodiments described herein can be implemented in numerous ways, such as a process, an apparatus, a system, a device, or a method executed on a processing machine. Several inventive embodiments are described below.

In certain embodiments, the above mentioned first feeder circuit may include first and second buffer circuits that are arranged in parallel between the serial interface circuit and the first processing element. The control circuit may generate read address and write address signals for the first and second buffer circuits.

If desired, the first feeder circuit may further include a first-in first-out buffer having an input and an output. The input may be coupled to the serial interface circuit and the output to the second feeder circuit. The control circuit may send a valid signal to the second feeder circuit when the first data signal is available at the output of the first-in first-out buffer. The control circuit may further send a ready signal to the serial interface circuit when the input of the first-in first-out buffer is ready to receive an additional data signal.

Further features of the invention, its nature and various advantages, will be apparent from the accompanying drawings and the following detailed description of the preferred embodiments.

DETAILED DESCRIPTION

The present embodiments provided herein relate to integrated circuits and, more particularly, to interface circuitry between a serial interface circuit and an array or processing elements in an integrated circuit.

Massively parallel computing architectures, which are particularly well suited for applications such as image and signal processing, are often implemented by an array of processing elements (e.g., a systolic array). Such an array of processing elements is often spatially distributed in an integrated circuit to fulfill the demand for distributed memory and computing power, simple and regular communication structure, intensive use of pipelining, and local communication in time and space.

In many applications, the array of processing elements receives data through a serial interface circuit and/or transmits processed data through a serial interface circuit. For example, the array of processing elements may receive and/or transmit data via a serial memory interface circuit from and/or to a storage circuit (e.g., from a double data rate fourth-generation synchronous dynamic random-access memory (DDR4 SDRAM)). The storage circuit may be located on the same die or on a different die in the same package as the array of processing elements. If desired, the storage circuit may be located in a different package on the same printed circuit board (PCB) or in a different package on a different printed circuit board.

In some embodiments, the array of processing elements may receive and/or transmit data through a high speed serial interface (HSSI) circuit. Such a high speed serial interface circuit may accommodate communications using different protocols and/or standards. Such protocols and/or standards may include network standards and protocols such as low-voltage differential signaling (LVDS), Interlaken, Peripheral Component Interconnect Express (PCIe), Ethernet, gigabit Ethernet (GigE) such as the 10 Gigabit Attachment Unit Interface (XAUI), or other communications network standards or protocols.

However, most known circuit configurations do not address how data is delivered from the serial interface circuit, which may be located on an edge of the integrated circuit, to the different processing elements of the array of processing elements, which may be scattered throughout the integrated circuit, and/or how data is collected from the array of processing elements and transmitted through the serial interface circuit. Furthermore, most known circuit configurations do not address that data sometimes arrives in bursts and/or that data needs to be fetched in a specific order.

Consequently, it is desirable to provide interface circuitry that is coupled between the serial interface circuit and the array of processing elements. In particular, it may be desirable to provide distributed feeder circuits that transport and cache data between the serial interface circuit and the array of processing elements and to provide distributed drain circuits that receive data from the array of processing elements and aggregate and assemble the data for transmission over the same or another serial interface circuit.

It will be recognized by one skilled in the art, that the present exemplary embodiments may be practiced without some or all of these specific details. In other instances, well-known operations have not been described in detail in order not to unnecessarily obscure the present embodiments.

Figure 1:
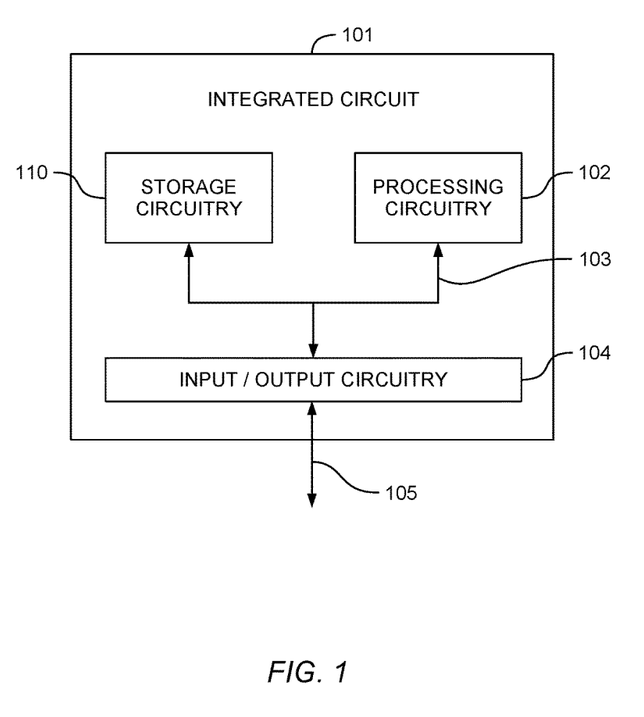
FIG. 1 is a diagram of an illustrative integrated circuit in accordance with an embodiment.

An illustrative embodiment of an integrated circuit 101 is shown in FIG. 1. Integrated circuit 101 may have multiple components. These components may include processing circuitry 102, storage circuitry 110, and input-output circuitry 104. Processing circuitry 102 may include embedded microprocessors, digital signal processors (DSP), microcontrollers, or other processing circuitry. For example, processing circuitry 102 may include an array of processing elements. If desired, the processing elements may form a homogeneous network that couples the processing elements regularly and locally, thereby forming a systolic array. In some embodiments, processing circuitry 102 may include an interface circuit that is coupled between the processing elements and input-output circuitry 104 and/or between the processing elements and storage circuitry 110.

Storage circuitry 110 may have random-access memory (RAM), read-only memory (ROM), or other addressable memory circuits. Storage circuitry 110 may be a single-port memory, a dual-port memory, a quad-port memory, or have any other arbitrary number of ports. If desired, storage circuitry 110 may be implemented as a single-port memory with control circuitry that emulates dual-port, quad-port, or other multi-port behavior. Processing circuitry 102 may access storage circuitry 110 by sending read and/or write requests over interconnection resources 103 to storage circuitry 110. In some embodiments, external components may access storage circuitry 110 via external interconnection resources 105, input-output circuitry 104, and interconnection resources 103. In response to receiving a read request, storage circuitry 110 may retrieve the requested data and send the retrieved data over interconnection resources 103 to the requestor. In case of a write request, storage circuitry 110 may store the received data.

Internal interconnection resources 103 such as conductive lines and busses may be used to send data from one component to another component or to broadcast data from one component to one or more other components. External interconnection resources 105 such as conductive lines and busses, optical interconnect infrastructure, or wired and wireless networks with optional intermediate switches may be used to communicate with other devices.

Input-output circuitry 104 may include parallel input-output circuitry, differential input-output circuitry, serial data transceiver circuitry, or other input-output circuitry suitable to transmit and receive data. In certain embodiments, input-output circuitry 104 may include an interface circuit that is coupled between the serial data transceiver circuitry and processing circuitry 102.

Figure 2A:
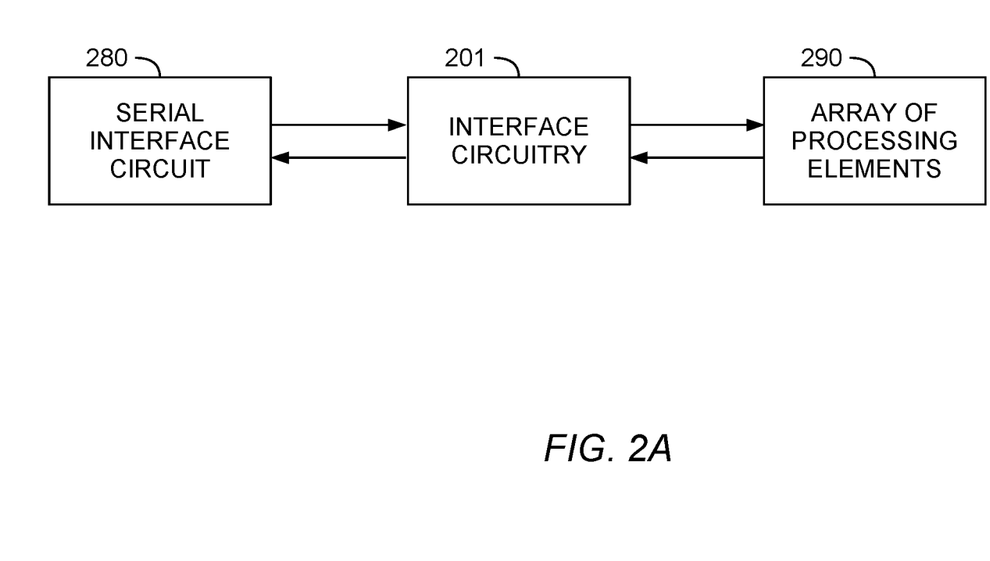
FIG. 2A is a diagram of illustrative interface circuitry coupled between a serial interface circuit and an array of processing elements in accordance with an embodiment.

FIG. 2A is a diagram of illustrative interface circuitry 201 which is coupled between serial interface circuit 280 and array of processing elements 290 in accordance with an embodiment. Array of processing elements 290 may include a plurality of connected processing elements. A processing element in the array of processing elements may have one or more input ports and at least one output port. The processing element may receive data at the one or more input ports from interface circuitry 201 and/or from one or more other processing elements of the array of processing elements 290.

If desired, the processing element may process the received data and provide the processed data at an output port. In some embodiments, the processing element may route the received data from an input port to an output port without processing the received data. The processing element may send the data from the output port to one or more other processing elements of the array of processing elements 290 and/or to interface circuitry 201.

Serial interface circuit 280 may include one or more serial interface sub-circuits each having one or more channels through which data may be received and transmitted serially. For example, serial interface circuit 280 may include a serial memory interface circuit and/or a high speed serial interface (HSSI) circuit, if desired. The serial memory interface circuit may receive data from a storage circuit (e.g., from a double data rate fourth-generation synchronous dynamic random-access memory (DDR4 SDRAM)) and/or transmit data to a storage circuit.

The high speed serial interface (HSSI) circuit may accommodate communications using different protocols and/or standards. Such protocols and/or standards may include low-voltage differential signaling (LVDS), Interlaken, Peripheral Component Interconnect Express (PCIe), Ethernet, gigabit Ethernet (GigE) such as the 10 Gigabit Attachment Unit Interface (XAUI), or other communications network standards or protocols.

As shown, interface circuitry 201 may be coupled between serial interface circuit 280 and array of processing elements 290. Interface circuitry 201 may include feeder circuits and drain circuits. Feeder circuits may receive data from serial interface circuit 280 and transmit the received data to array of processing elements 290. If desired, feeder circuits may be arranged in one or more daisy chain in which two or more feeder circuits are coupled in series.

Drain circuits may receive data from array of processing elements 290 and transmit the received data to serial interface circuit 280. If desired, drain circuits may be arranged in one or more daisy chain in which two or more drain circuits are coupled in series. In certain embodiments, interface circuitry 201 may include synchronization circuitry to assemble and aggregate data from the drain circuits.

Figure 2B:
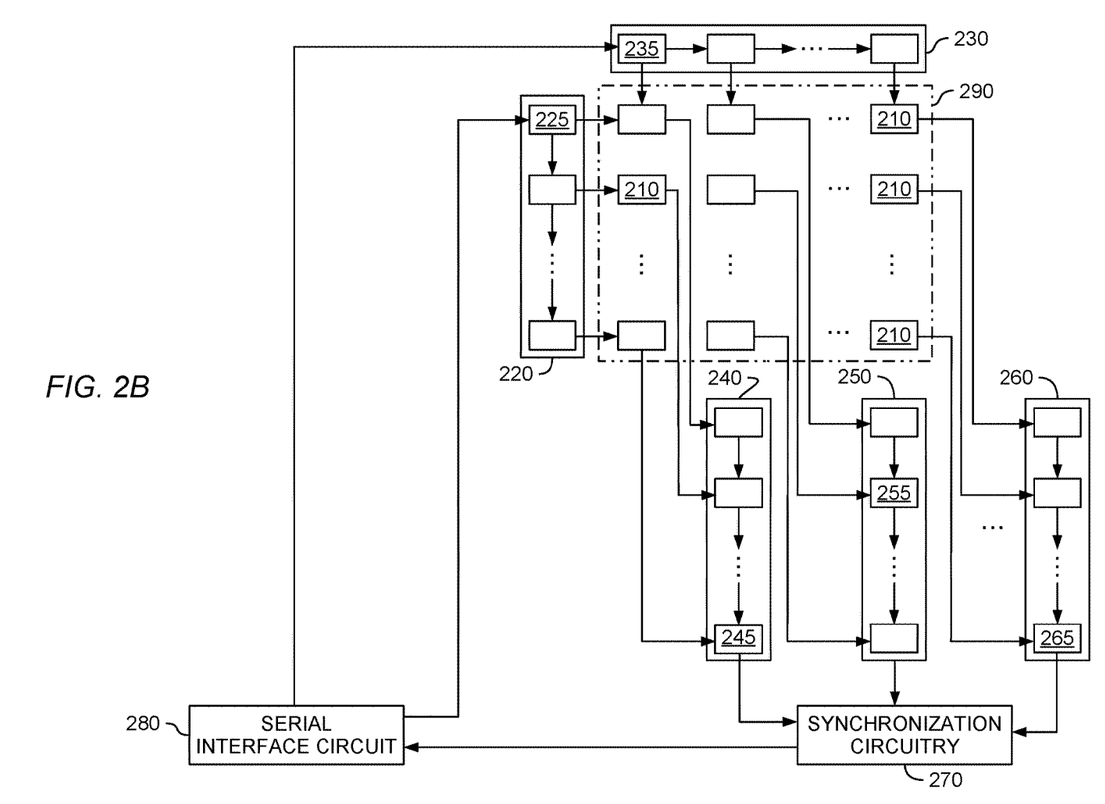
FIG. 2B is a diagram of illustrative daisy chains of feeder circuits and drain circuits coupled between a serial interface circuit and an array of processing elements in accordance with an embodiment.

FIG. 2B is a diagram of illustrative daisy chains of feeder circuits and drain circuits coupled between serial interface circuit 280 and array of processing elements 290 in accordance with an embodiment.

As shown, array of processing elements 290 includes a plurality of identical processing elements 210. If desired, array of processing elements 290 may include different variants of processing elements. For example, array of processing elements 290 may include different subsets of processing elements such that each subset includes a different type of processing element. For example, individual rows or columns of array of processing elements 290 may have identical processing elements while two different rows may include different processing elements. As an example, a first row may include multiplier circuits only, while a second row may include multiply-accumulate circuits, and a third row includes adder circuits only.

Processing elements 210 in array of processing elements 290 may implement any function of the one or more inputs. For example, processing elements 210 may implement logic functions (e.g., logic AND, logic OR, inversion, logic exclusive OR, logic NAND, logic NOR, etc.), arithmetic functions (e.g., sum, addition, subtraction, multiplication, division, square root, etc.), trigonometric functions (e.g., sine, cosine, tangent, cotangent, etc.), etc. or any combination thereof. As an example, array of processing elements 290 may implement a geometric operation in image processing (e.g., translation of pixels in a predetermined direction, image scaling, image skewing, image distortion, rotation of the image by an angle, etc.).

In certain embodiments, processing elements 210 may be locally connected to each other. For example, a processing element 210 may receive data from the processing element above and from the processing element to the left.

Interface circuitry that is coupled between serial interface circuit 280 and array of processing elements 290 may include feeder circuits 225 and 235, drain circuits 245, 255, and 265, and synchronization circuitry 270.

Feeder circuits 225 and 235 may be arranged in first and second daisy chains of feeder circuits 220 and 230, respectively. For example, a first feeder circuit 225 of the daisy chain of feeder circuits 220 may receive data from serial interface circuit 280 and transmit the received data to a processing element and a second feeder circuit in the daisy chain of feeder circuits 220. If desired, all feeder circuits in a daisy chain of feeder circuits may be identical. In some embodiments, a daisy chain of feeder circuits may include different feeder circuits.

Drain circuits 245, 255, and 265 may be arranged in first, second, and third daisy chains of drain circuits 240, 250, and 260, respectively. For example, a first drain circuit 255 of the daisy chain of drain circuits 250 may receive data from a processing element of the array of processing elements 290 and from a second drain circuit in the daisy chain of drain circuits 250. Drain circuit 255 may transmit the received data to a third drain circuit in the daisy chain of drain circuits 250. The last drain circuit in the daisy chain of drain circuits 250 may transmit the data to synchronization circuitry 270. If desired, all drain circuits in a daisy chain of drain circuits may be identical. In some embodiments, a daisy chain of drain circuits may include different drain circuits.

Each of the first, second, and third daisy chain of drain circuits 240, 250, and 260 may be coupled to synchronization circuitry 270 which may aggregate the data received from the drain circuits and transmit the aggregated data to serial interface circuit 280.

As shown, processing elements 210 in the leftmost column of array of processing elements 290 may receive data from feeder circuits 225 in daisy chain of feeder circuits 220, while processing elements 210 in the top row of array of processing elements 290 receive data from feeder circuits 235 in daisy chain of feeder circuits 230.

Figure 3:
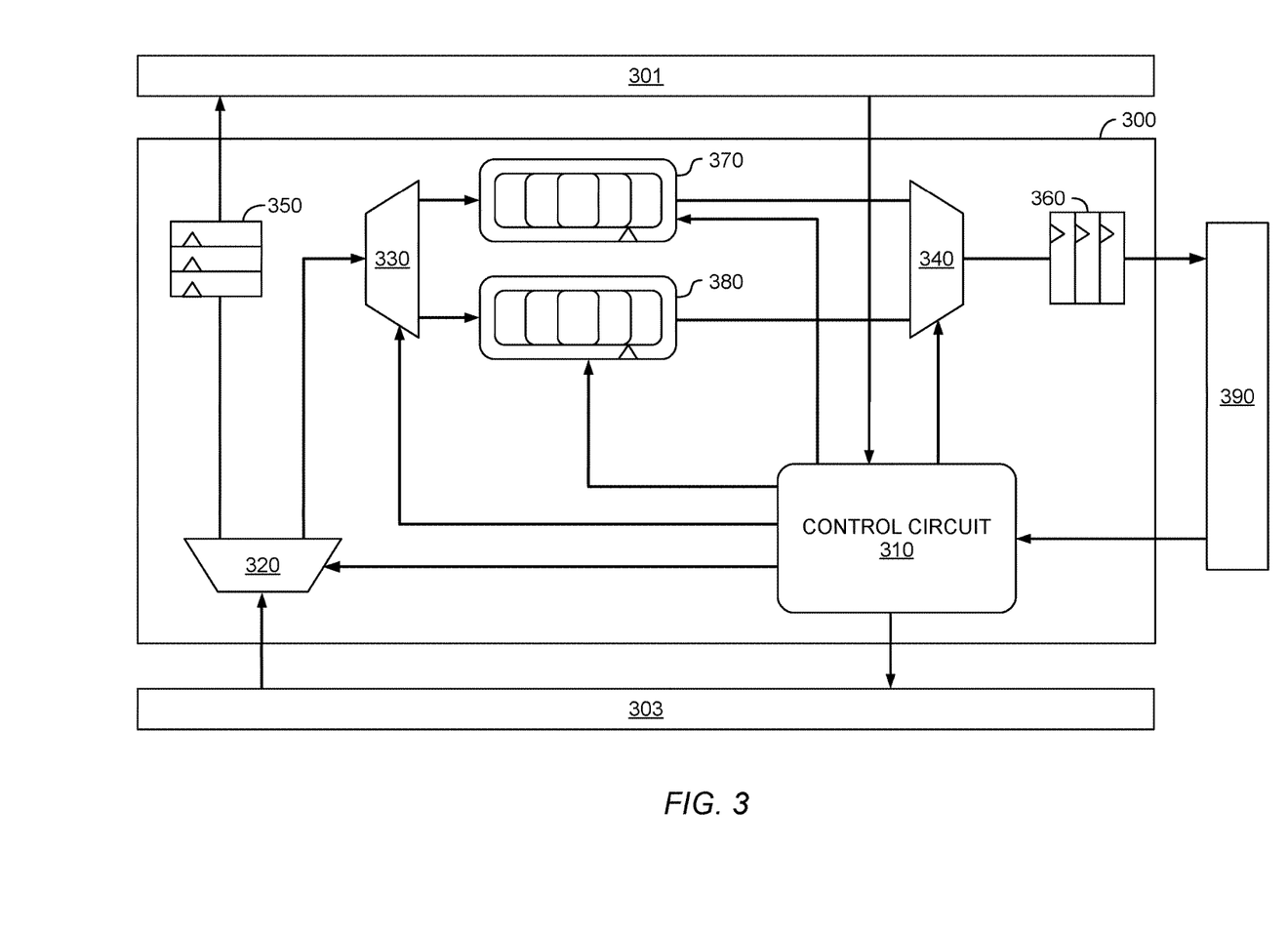
FIG. 3 is a diagram of an illustrative feeder circuit with buffer circuits, a bypass path, and a control circuit in accordance with an embodiment.

FIG. 3 is a diagram of an illustrative feeder circuit 300, which may implement feeder circuits 225 or 235 of FIG. 2B, as an example. Feeder circuit 300 may include buffer circuits 370 and 380, first-in first-out (FIFO) buffers 350 and 360, routing circuits 320 and 330, multiplexer 340, and control circuit 310. In certain embodiments, FIFO buffer 350 and/or 360 may implement a first word fall through (FWFT) FIFO buffer such that the data signal that is written into FIFO buffer 350 and/or 360 is immediately available on the output of FIFO buffer 350 and/or 360.

In some scenarios, spatially distributed pipeline registers may form FIFO buffer 350 and/or 360. Thus, feeder circuit 300 may be placed spatially close to processing element 390 and feeder circuit 301 may be placed spatially close to the processing element that is fed by feeder circuit 301. Routing circuit 320 and the spatially distributed pipeline registers that form FIFO buffer 350 may implement a bypass path between feeder circuit 303 and feeder circuit 301.

Feeder circuit 300 may be coupled between a serial interface circuit (not shown) and a processing element in an array of processing elements (e.g., processing element 390). As shown, feeder circuit 300 may be coupled in a daisy chain of feeder circuits between feeder circuits 301 and 303. For example, feeder circuit 300 may receive data from the serial interface circuit through feeder circuit 303 and transmit data to feeder circuit 301 and processing element 390.

Consider the scenario in which control circuit 310 of feeder circuit 300 sends a ready signal to feeder circuit 303 (e.g., to indicate that FIFO buffer 350 is ready to receive a data signal). In response to receiving the ready signal from feeder circuit 300, feeder circuit 303 may send a data signal to feeder circuit 300, which routing circuit 320 of feeder circuit 300 may receive.

Control circuit 310 may control routing circuit 320. For example, control circuit 310 may enable the propagation of the data signal through routing circuit 320 to FIFO buffer 350 and/or to routing circuit 330, if desired. For example, control circuit 310 may receive a ready signal from feeder circuit 301 and, in response to receiving the ready signal, enable the propagation of the data signal through routing circuit 320 to FIFO buffer 350 and from there to feeder circuit 301. Thus, routing circuit 320 and FIFO buffer 350 form a bypass path between feeder circuit 303 and feeder circuit 301. If desired, control circuit 310 may send a valid signal to feeder circuit 301 when a data signal is available at the output of FIFO buffer 350.

In some scenarios, FIFO buffer 350 may send a status signal to control circuit 310 (not shown). For example, FIFO buffer 350 may send a full signal when FIFO buffer 350 is full and cannot accommodate another data signal, an almost full signal when FIFO buffer 350 can only accept a predetermined quantity of additional data signals, an almost empty signal when FIFO buffer 350 stores less than a predetermined quantity of data signals, an empty signal when FIFO buffer 350 does not store any more data signals, etc.

In these scenarios, control circuit 310 may provide corresponding control signals to routing circuit 320 and/or feeder circuit 303. For example, in response to receiving a full signal from FIFO buffer 350, control circuit 310 may disable the propagation of the data signal through routing circuit 320.

Buffer circuits 370 and 380 may be implemented using random-access memory (RAM) circuits, FIFO circuits, or other suitable storage circuits. Control circuit 310 may control access to buffer circuits 370 and 380. For example, control circuit 310 may generate read address signals, write address signals, read enable signals, write enable signals, etc. for the buffer circuits 370 and 380.

As shown, buffer circuits 370 and 380 may be arranged in parallel between routing circuit 330 and multiplexer 340. Multiplexer 340 may be coupled between buffer circuits 370 and 380 and FIFO buffer 360. Multiplexer 340 may receive data signals from buffer circuits 370 and 380 and control circuit 310 may select between the received data signals.

Control circuit 310 may control routing circuit 330. For example, control circuit 310 may enable the propagation of a data signal from routing circuit 320 through routing circuit 330. If desired, control circuit 310 may select to which buffer circuit 370 and/or 380 the data signal is routed to. For example, control circuit 310 may enable the propagation of the data signal through routing circuit 330 to buffer circuit 370 if buffer circuit 370 is not full and if buffer circuit 370 is not accessed by a read operation.

In some embodiments, control circuit 310 may enable writing to one buffer circuit and reading from the other buffer circuit. For example, control circuit 310 may enable writing to buffer circuit 370, thereby storing data signals from the serial interface circuit in buffer circuit 370, while control circuit 310 enables reading from buffer circuit 380 and selects the data received from buffer circuit 380 in multiplexer 340, thereby pushing data from buffer circuit 380 to processing element 390.

If desired, control circuit 310 may cause a switch from writing to buffer circuit 370 and reading from buffer circuit 380 to writing to buffer circuit 380 and reading from buffer circuit 370. For example, a predetermined state of buffer circuit 370 and/or buffer circuit 380 (e.g., all data signals that were stored in buffer circuit 380 have been retrieved, a predetermined quantity of data signals that were stored in buffer circuit 380 have been retrieved, buffer circuit 370 is full, buffer circuit 370 stores more than a predetermined quantity of data signals, etc.) may cause this switch in read and write access operations at buffer circuits 370 and 380.

If desired, control circuit 310 may control read access operations that retrieve data signals from buffer circuits 370 and/or 380 in such a way that data is re-used. For example, control circuit 310 may control buffer circuits 370 and/or 380 such that the same data signal is retrieved from buffer circuits 370 and/or 380 and pushed to processing element 390 multiple times.

As an example, consider the scenario in which control circuit 310 enables read access operations at buffer circuit 370. In this scenario, control circuit 310 may control buffer circuit 370 and multiplexer 340 such that the data stored at a first predetermined address (e.g., address 0) of buffer circuit 370 is pushed a predetermined number of times (e.g., four times) to processing element 390 followed by the data stored at a second predetermined address (e.g., address 1) of buffer circuit 370 being pushed the same or another predetermined number of times (e.g., four times) to processing element 390. For example, processing element 390 may receive a sequence of data from addresses zero, zero, zero, zero, one, one, one, one, etc.

As another example, control circuit 310 may control buffer circuit 370 and multiplexer 340 such that the data stored at a predetermined number of addresses (e.g., addresses 0, 1, 2, 3, 4, 5, and 6) is pushed repeatedly (e.g., three times) to processing element 390. For example, processing element 390 may receive a sequence of data from addresses zero, one, two, three, four, five, six, zero, one, two, three, four, five, six, zero, one, two, three, four, five, six, etc.

Processing element 390 may process the received data signal and send the processed data signal to a drain circuit which may transmit the processed data signal through synchronization circuitry to a serial interface circuit which may be a different or the same serial interface circuit from which feeder circuit 300 has received the data signal.

Figure 4:
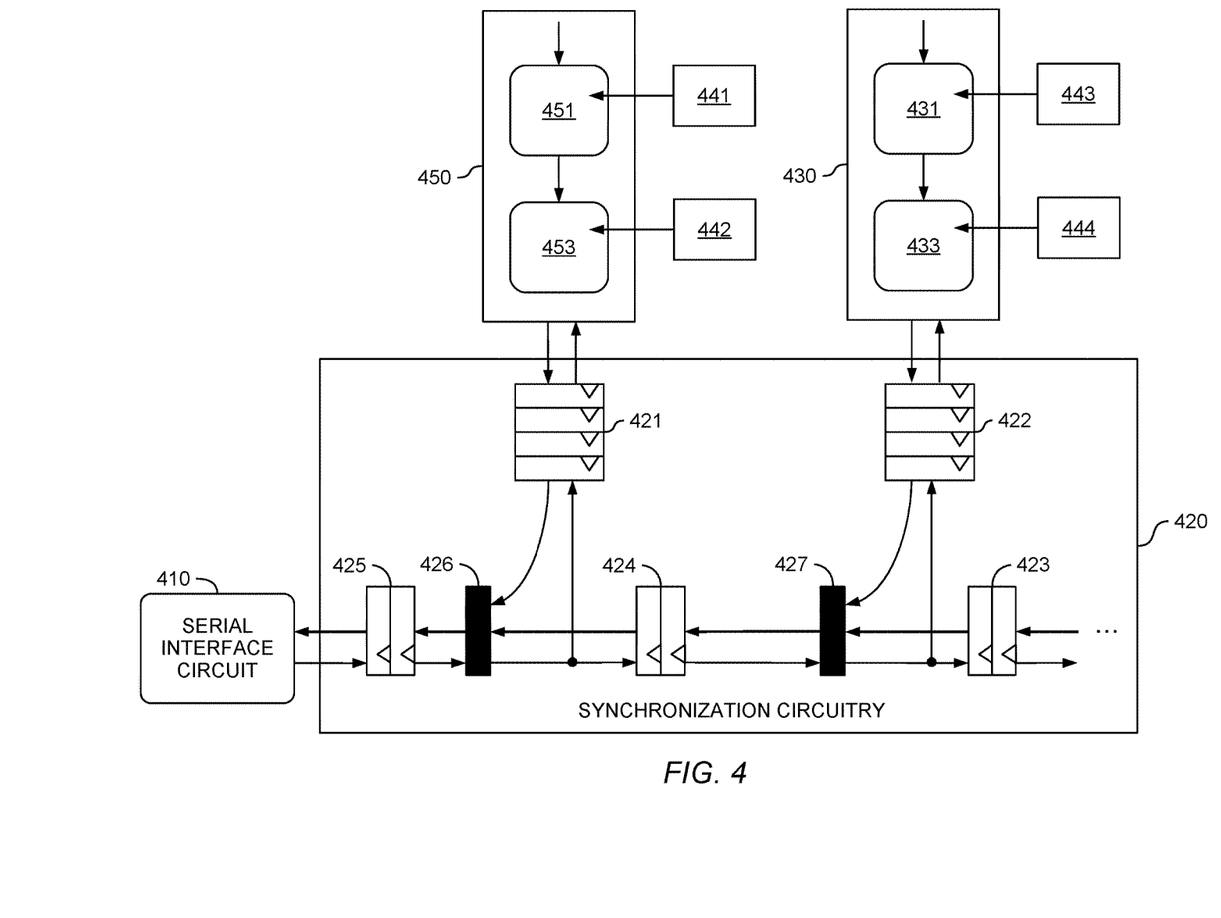
FIG. 4 is a diagram of illustrative synchronization circuitry coupled between drain circuits and a serial interface circuit in accordance with an embodiment.

FIG. 4 is a diagram of illustrative synchronization circuitry coupled between drain circuits and a serial interface circuit in accordance with an embodiment. Drain circuits 431 and 433 and drain circuits 451 and 453 may be coupled in daisy chains of drains circuits 430 and 450 respectively which each may communicate with synchronization circuitry 420.

Drain circuit 431 may receive a processed data signal from processing element 443 and propagate the processed data signal to drain circuit 433. Drain circuit 433 may receive the processed data signal from drain circuit 431 and another processed data signal from processing element 444 and propagate both data signals to synchronization circuitry 420.

Similarly, drain circuit 451 may receive a processed data signal from processing element 441 and propagate the processed data signal to drain circuit 453. Drain circuit 453 may receive the processed data signal from drain circuit 451 and another processed data signal from processing element 442 and propagate both data signals to synchronization circuitry 420.

As shown, synchronization circuitry 420 may include FIFO buffers 421 and 422, register pipeline stages 423, 424, and 425, and synchronization nodes 426 and 427. Synchronization circuitry 420 may be coupled between daisy chains of drain circuits 430 and 450 and serial interface circuit 410.

Synchronization circuitry 420 may receive data signals from daisy chains of drain circuits 450 and 430 at FIFO buffers 421 and 422, respectively. FIFO buffers 421 and 422 may store the received data signals and send the data signals to synchronization nodes 426 and 427, respectively.

In certain embodiments, FIFO buffers 421 and/or 422 may implement a first word fall through (FWFT) FIFO buffer such that the data signal that is written into FIFO buffer 421 and/or 422 is immediately available on the output of FIFO buffer 421 and/or 422. If desired, FIFO buffers 421 and 422 may be omitted.

In some scenarios, FIFO buffers 421 and 422 may send a status signal to drain circuits 453 and 433, respectively. For example, FIFO buffer 421 and/or 422 may send a full signal when FIFO buffer 421 and/or 422 is full and cannot accommodate another data signal, an almost full signal when FIFO buffer 421 and/or 422 can only accept a predetermined quantity of additional data signals, an almost empty signal when FIFO buffer 421 and/or 422 stores less than a predetermined quantity of data signals, an empty signal when FIFO buffer 421 and/or 422 does not store any more data signals, etc.

Register pipeline stages 423, 424, and 425 may include one or more levels of consecutive pipeline registers. If desired, register pipeline stages 423, 424, and 425 may have the same or a different number of levels of consecutive pipeline registers and be spatially distributed between synchronization nodes 426 and 427 and serial interface circuit 410, thereby enabling the placement of synchronization nodes 427 and 426 spatially close to drain circuits 433 and 453, respectively.

In some scenarios, FIFO circuits may implement one or more of register pipeline stages 423, 424, and 425. In these scenarios, the FIFO circuits may send status signals to synchronization nodes 426 and 427.

As shown, synchronization nodes 426 and 427 may receive data signals from FIFO buffers 421 and 422, respectively, and from register pipeline stages 424 and 423, respectively, and aggregate the received data signals. Synchronization nodes 426 and 427 may aggregate the received data signals differently (e.g., through arbitration, interleaving, concatenation, etc.) and independently of each other, if desired.

In some embodiments, synchronization nodes 426 and 427 may perform arbitration to aggregate the data signals received from FIFO buffers 421 and 422, respectively, and the data signals received from register pipeline stages 424 and 423, respectively. For example, synchronization node 426 may select between the data signal received from FIFO buffer 421 and the data signal received from register pipeline stage 424 at predetermined time intervals and transmit the selected data signal. Similarly, synchronization node 427 may select between the data signal received from FIFO buffer 422 and the data signal received from register pipeline stage 423 at predetermined time intervals and transmit the selected signal.

Alternatively, synchronization node 426 may interleave the data signal received from register pipeline stage 424 with the data signal received from FIFO buffer 421 at predetermined time intervals and transmit the interleaved data signal. Similarly, synchronization node 427 may interleave the data signal received from register pipeline stage 423 with the data signal received from FIFO buffer 422 at predetermined time intervals and transmit the interleaved data signal. For example, synchronization nodes 426 and 427 may interleave the received data signals bit by bit, byte by byte, word by word, etc.

In certain embodiments, synchronization nodes 426 and 427 may concatenate the received data signals in parallel wires. For example, synchronization node 427 may receive a 32-bit data signal from FIFO buffer 422 and a 448-bit data signal from register pipeline stage 423 and send a 480-bit data signal to register pipeline stage 424. Similarly, synchronization node 426 may receive a 32-bit data signal from FIFO buffer 421 and the 480-bit data signal from register pipeline stage 424 and send a 512-bit data signal through register pipeline stage 425 to serial interface circuit 410. Thus, in this example, the number of bits increases by 32-bits at every synchronization node.

In some scenarios, synchronization nodes 426 and 427 may concatenate the data signal received from FIFO buffers 421 and 422, respectively, beyond the most significant bit (MSB) of the data signal that the respective synchronization node 426 or 427 receives from register pipeline stage 424 and 423, respectively. In other scenarios, synchronization nodes 426 and 427 may concatenate the data signal received from FIFO buffers 421 and 422, respectively, beyond the least significant bit (LSB) of the data signal that the respective synchronization node 426 or 427 receives from register pipeline stage 424 and 423, respectively.

If desired, synchronization nodes 426 and 427 may transmit status signals to register pipeline stages 424 and 423 and/or to FIFO buffers 421 and 422, respectively.

Figure 5:
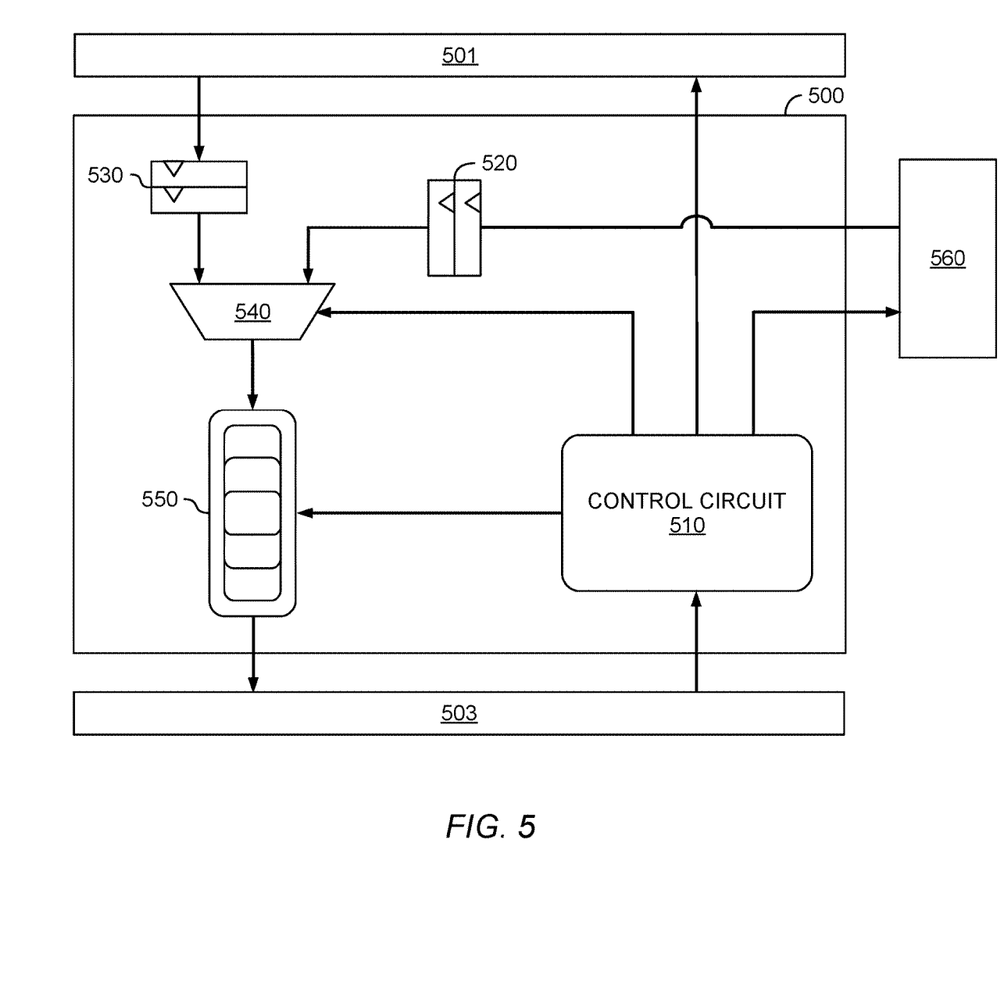
FIG. 5 is a diagram of an illustrative drain circuit with a buffer circuit and a control circuit in accordance with an embodiment.

FIG. 5 is a diagram of an illustrative drain circuit such as drain circuit 245, 255, or 265 of FIG. 2B in accordance with an embodiment. Drain circuit 500 may include buffer circuit 550, first-in first-out (FIFO) buffers 520 and 530, multiplexer 540, and control circuit 510. In certain embodiments, FIFO buffer 520 and/or 530 may implement a first word fall through (FWFT) FIFO buffer such that the data signal that is written into FIFO buffer 520 and/or 530 is immediately available on the output of FIFO buffer 520 and/or 530.

In some scenarios, spatially distributed pipeline registers may form FIFO buffer 520 and/or 530. Thus, drain circuit 500 may be placed spatially close to processing element 560 and drain circuit 501 may be placed spatially close to the processing element that is fed by drain circuit 501.

Drain circuit 500 may be coupled between a processing element in an array of processing elements (e.g., processing element 560) and a serial interface circuit (not shown). As shown, drain circuit 500 may be coupled in a daisy chain of drain circuits between drain circuits 501 and 503. For example, drain circuit 500 may receive data from a processing element of the array of processing elements through drain circuit 501 and transmit data through drain circuit 503 and synchronization circuitry (not shown) to the serial interface circuit.

Consider the scenario in which control circuit 510 of drain circuit 500 sends a ready signal to drain circuit 501 (e.g., to indicate that FIFO buffer 530 is ready to receive a data signal). In response to receiving the ready signal from drain circuit 500, drain circuit 501 may send a data signal to drain circuit 500, which FIFO buffer 530 of drain circuit 500 may receive.

If desired, control circuit 510 may send a ready signal to processing element 560 (e.g., to indicate that FIFO buffer 520 is ready to receive a data signal). In response to receiving the ready signal from drain circuit 500, processing element 560 may send a processed data signal to drain circuit 500, which FIFO buffer 520 of drain circuit 500 may receive.

Control circuit 510 may control multiplexer 540, thereby selecting whether a data signal from FIFO buffer 520 or a data signal from FIFO buffer 530 may propagate to buffer circuit 550. For example, consider the scenario in which processing element 560 produces data signals in bursts. In this scenario, control circuit 510 may select the data signal from FIFO buffer 520 when processing element 560 generates bursts of data signals and select the data signal from FIFO buffer 530 when processing element 560 is not in burst mode.

If desired, control circuit 510 may control buffer circuit 550. For example, control circuit 510 may receive a ready signal from drain circuit 503. In response to receiving the ready signal from drain circuit 503, control circuit 510 may direct buffer circuit 550 to push a data signal to drain circuit 503. If desired, control circuit 550 may send a control signal to buffer circuit 550 that directs buffer circuit 550 to shift data forward.

The size of buffer circuit 550 may depend on the application that is executed by the array of processing elements. For example, the size of buffer circuit 550 may be selected such that drain circuit 500 produces no stalls when receiving data signals from processing element 560 and from drain circuit 501.

Figure 6:
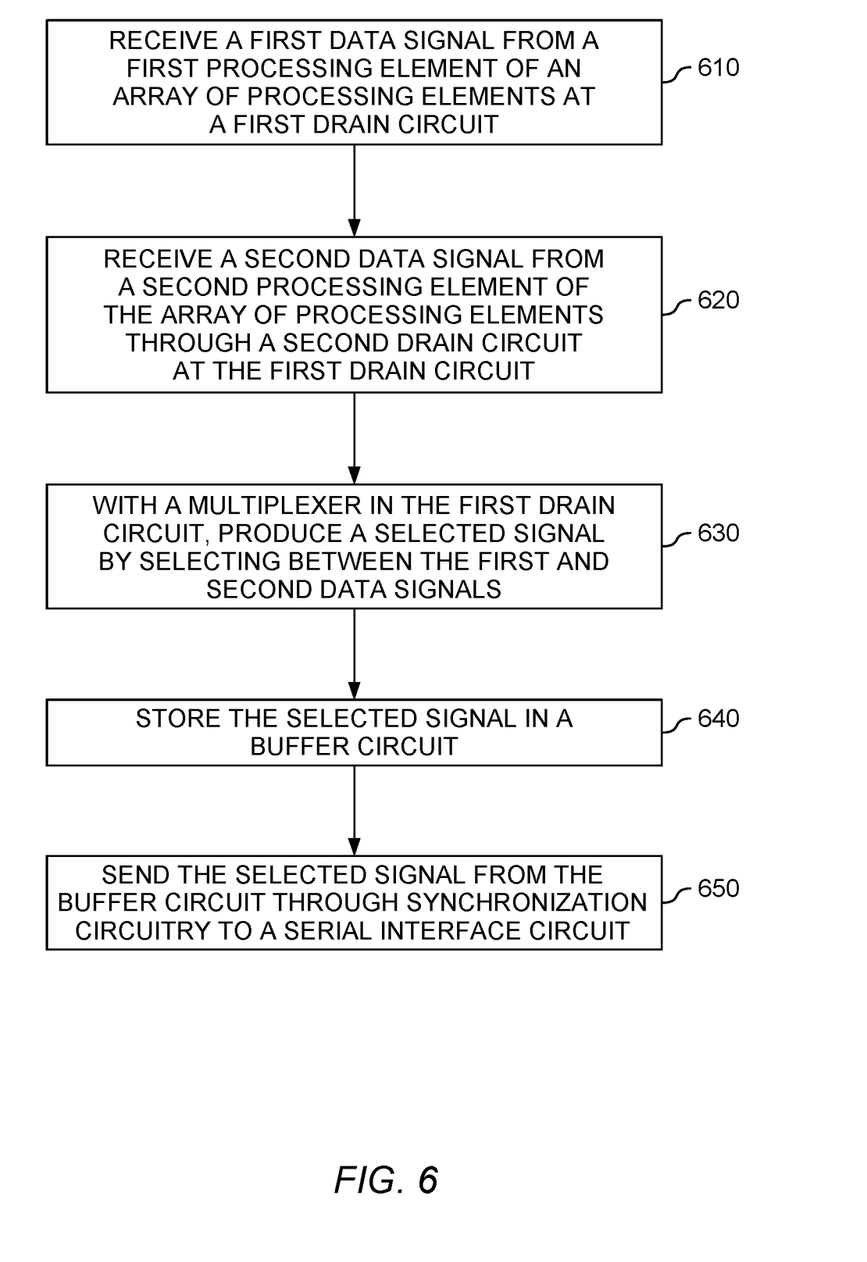
FIG. 6 is a diagram of a flow chart showing illustrative steps for operating interface circuitry of an array of processing elements in accordance with an embodiment.

FIG. 6 is a diagram of a flow chart showing illustrative steps for operating interface circuitry of an array of processing elements in accordance with an embodiment. During step 610, a first drain circuit may receive a first data signal from a first processing element of an array of processing elements. For example, drain circuit 500 of FIG. 5 may receive a data signal from processing element 560.

During step 620, the first drain circuit may receive a second data signal from a second processing element of the array of processing elements through a second drain circuit. For example, drain circuit 500 of FIG. 5 may receive a data signal from drain circuit 501, which drain circuit 501 has received from another processing element (not shown in FIG. 5).

During step 630, a multiplexer in the first drain circuit may produce a selected signal by selecting between the first and second data signals. For example, multiplexer 540 of drain circuit 500 may select between the data signal received from drain circuit 501 through FIFO buffer 530 and the data signal received from processing element 560 through FIFO buffer 520.

During step 640, the drain circuit may store the selected signal in a buffer circuit. For example, drain circuit 500 of FIG. 5 may store the output of multiplexer 540 in buffer circuit 550.

During step 650, the drain circuit may send the selected signal from the buffer circuit through synchronization circuitry to a serial interface circuit. For example, drain circuit 500 of FIG. 5 may send the data signal from the output of buffer circuit 550 through drain circuit 503 and synchronization circuitry (e.g., synchronization circuitry 420 of FIG. 4) to a serial interface circuit (e.g., serial interface circuit 410 of FIG. 4).

The method and apparatus described herein may be incorporated into any suitable electronic device or system of electronic devices. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using interface circuitry between an array of processing elements and a serial interface circuit is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination. The above described embodiments are presented for purposes of illustration and not of limitation, and the present invention is limited only by the claims that follow.

What is claimed is:

1. Interface circuitry of an array of processing elements in an integrated circuit, comprising:
   feeder circuits that are coupled in a first daisy chain, wherein a first feeder circuit of the feeder circuits receives a first data signal from a serial interface circuit, and wherein a control circuit in the first feeder circuit controls a transmission of the first data signal to a second feeder circuit of the feeder circuits and to a first processing element of the array of processing elements;
   drain circuits that are coupled in a second daisy chain, wherein a first drain circuit of the drain circuits receives a second data signal from a second processing element of the array of processing elements and a third data signal from a second drain circuit of the drain circuits and sends the second and third data signals to the serial interface circuit;
   additional drain circuits that are coupled in a third daisy chain; and
   a synchronization node that is coupled between the drain circuits, the additional drain circuits, and the serial interface circuit, receives the second data signal from the first drain circuit and a fourth data signal from an additional drain circuit of the additional drain circuits, and aggregates the second data signal and the fourth data signal to generate a fifth data signal.

2. The interface circuitry of claim 1, further comprising:
   an additional synchronization node that is coupled between the synchronization node and the serial interface circuit; and
   a register pipeline stage that is coupled between the synchronization node and the additional synchronization node.

3. The interface circuitry of claim 1, wherein the first feeder circuit further comprises:
   first and second buffer circuits that are arranged in parallel between the serial interface circuit and the first processing element, wherein the control circuit generates read address and write address signals for the first and second buffer circuits.

4. The interface circuitry of claim 3, further comprising:
   a multiplexer coupled between the first and second buffer circuits and the first processing element of the array of processing elements, wherein the multiplexer receives fourth and fifth data signals from the first and second buffer circuits and wherein the control circuit selects between the fourth and fifth data signals.

5. The interface circuitry of claim 1, wherein the first feeder circuit further comprises:
   a first-in first-out buffer having an input and an output, wherein the input is coupled to the serial interface circuit and the output is coupled to the second feeder circuit.

6. The interface circuitry of claim 5, wherein the control circuit sends a valid signal to the second feeder circuit when the first data signal is available at the output of the first-in first-out buffer, and wherein the control circuit sends a ready signal to the serial interface circuit when the input of the first-in first-out buffer is ready to receive an additional data signal.

7. The interface circuitry of claim 1, wherein the first drain circuit further comprises:
   an additional control circuit; and a multiplexer that receives the second data signal from the second processing element of the array of processing elements and the third data signal from the second drain circuit of the drain circuits, and wherein the additional control circuit selects between the second and third data signals.

8. The interface circuitry of claim 7, wherein the first drain circuit further comprises:
a first-in first-out buffer that is coupled between the multiplexer and the serial interface circuit.

9. Interface circuitry of an array of processing elements in an integrated circuit, comprising:
feeder circuits that are coupled in a first daisy chain, wherein a first feeder circuit of the feeder circuits receives a first data signal from a serial interface circuit, and wherein a control circuit in the first feeder circuit controls a transmission of the first data signal to a second feeder circuit of the feeder circuits and to a first processing element of the array of processing elements;
drain circuits that are coupled in a second daisy chain, wherein a first drain circuit of the drain circuits receives a second data signal from a second processing element of the array of processing elements and a third data signal from a second drain circuit of the drain circuits and sends the second and third data signals to the serial interface circuit, wherein the first feeder circuit includes:
an output port coupled to a processing element of the array of processing elements;
an input port that receives the first data signal from the serial interface circuit;
first and second storage circuits that are coupled in parallel between the input port and the output port; and
routing circuitry coupled between the input port and the first and second storage circuits, wherein the control circuit is coupled to the first and second storage circuits and to the routing circuitry, and wherein the control circuit directs the routing circuitry to route the first data signal from the input port to the first storage circuit and the first storage circuit to perform a write access operation that stores the first data signal in the first storage circuit.

10. The interface circuitry of claim 9, further comprising:
an additional output port coupled to the second feeder circuit; and
a bypass path that conveys an additional data signal from the input port to the additional output port.

11. The interface circuitry of claim 10, further comprising:
a buffer circuit in the bypass path, wherein the control circuit directs the buffer circuit to store the additional data signal.

12. The interface circuitry of claim 11, wherein the control circuit generates a ready signal for the serial interface circuit when the buffer circuit is ready to receive another additional data signal.

13. The interface circuitry of claim 9, further comprising a multiplexer that is controlled by the control circuit and coupled between the first and second storage circuits and the output port.

14. The interface circuitry of claim 13, further comprising a buffer circuit coupled between the multiplexer and the output port.

15. The interface circuitry of claim 1, wherein the control circuit allows transmission of the first data signal to the second feeder circuit in response to receiving a ready signal from the second feeder circuit.

16. The interface circuitry of claim 1, wherein the control circuit generates a valid signal to the second feeder circuit when the first data signal is available.

* * * * *